United States Patent [19]
Bacardit

[11] Patent Number: 6,044,749
[45] Date of Patent: Apr. 4, 2000

[54] PNEUMATIC BRAKE BOOSTER WITH IMPROVED VALVE

[75] Inventor: Juan Simon Bacardit, Drancy, France

[73] Assignee: BoschSistemas de Frenado S.L., Barcelona, Spain

[21] Appl. No.: 09/117,298
[22] PCT Filed: Jun. 24, 1998
[86] PCT No.: PCT/FR98/01327
  § 371 Date: Jul. 24, 1998
  § 102(e) Date: Jul. 24, 1998
[87] PCT Pub. No.: WO99/00284
  PCT Pub. Date: Jan. 7, 1999

[30] Foreign Application Priority Data

Jun. 27, 1997 [FR] France ................................. 97 08120

[51] Int. Cl.[7] .............................. F15B 9/10; F15B 13/16
[52] U.S. Cl. ........................................... 91/367; 91/376 R
[58] Field of Search .................... 91/367, 376 R

[56] References Cited

U.S. PATENT DOCUMENTS

| 4,643,075 | 2/1987 | Wagner | 91/376 R |
| 4,794,844 | 1/1989 | Taft | 91/376 R |
| 4,905,571 | 3/1990 | DeHoff et al. | 91/376 R |

FOREIGN PATENT DOCUMENTS

| 140187 | 5/1985 | European Pat. Off. | 91/376 R |
| 97550 | 6/1983 | Japan | 91/376 R |

Primary Examiner—F. Daniel Lopez
Attorney, Agent, or Firm—Leo H McCormick, Jr.; Warren Constock

[57] ABSTRACT

A pneumatic brake booster having a casing (10) which is divided in a leaktight fashion by at least one movable wall (12) into a front chamber (14) and a rear chamber (16). A pneumatic piston (20) attached to the movable wall (12) has a tubular rear part (22) which extends through the casing (10). A three-way valve (36) which slides in a bore (26) of a pneumatic piston (20) has a valve element which interacts with a first valve seat (28a) formed on a plunger (28) and a second valve seat (20a) formed on the pneumatic piston (20) in response to an operating rod (30) moving a plunger (28) to selectively connects the rear chamber (16) to the front chamber (14) and to a source of high pressure to develop a pressure differential across the movable wall (12). A rear position of rest for the plunger (28) wherein the rear chamber (16) is connected to the front chamber (14) is defined by a front end (32) of a sleeve (34) located in the tubular rear part (22) of the pneumatic piston (20). The plunger (28) has a cylindrical rear part which slides on a front end (32) of the sleeve (34) and the sleeve (34) slides in a leaktight fashion in the bore (26) in response to movement of the operating rod (30). A return spring (38) is located between the pneumatic piston (20) and plunger (28) to permit un-interrupted communication from the high pressure source to the rear chamber (16) on movement of the plunger (28).

13 Claims, 4 Drawing Sheets

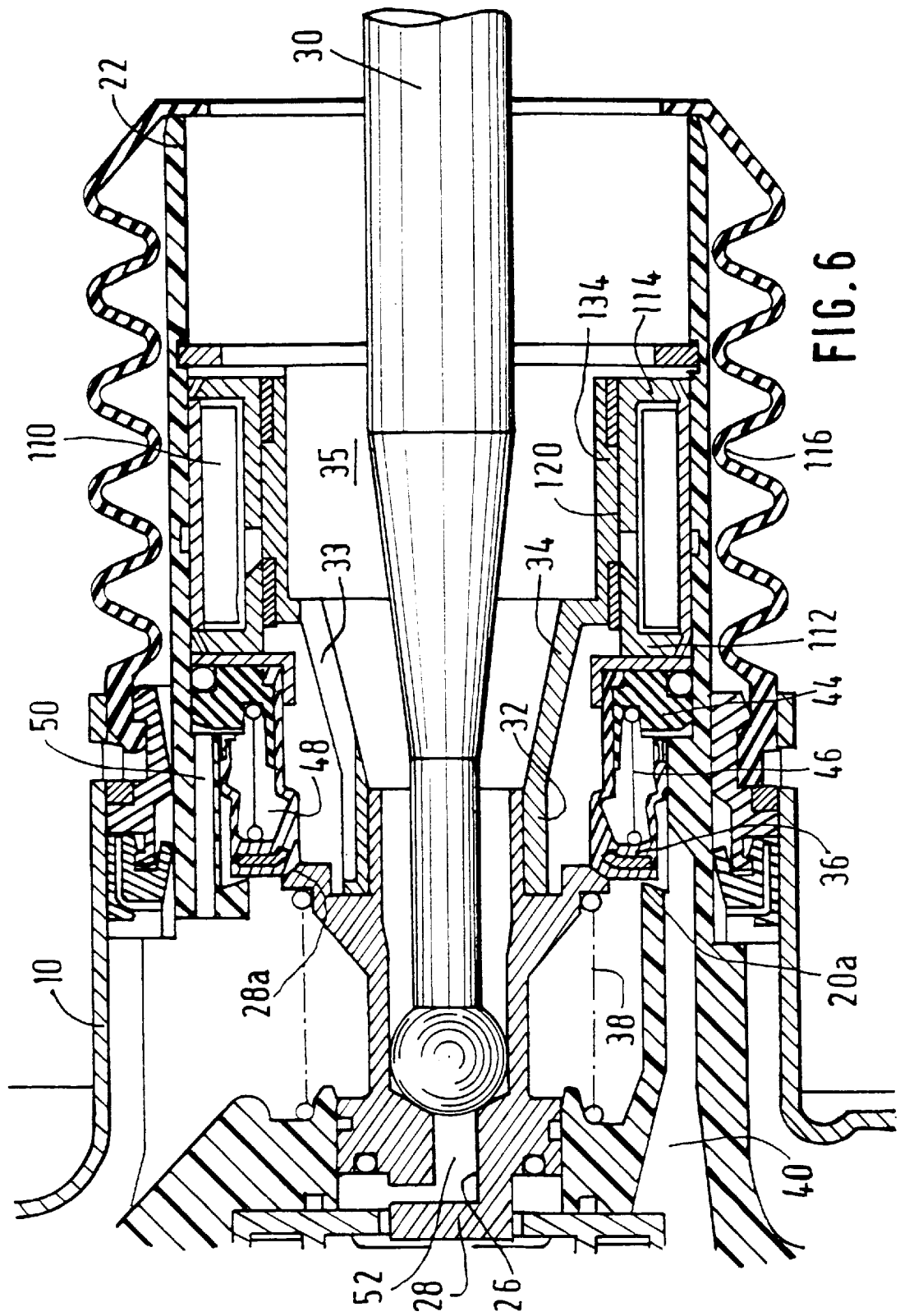

PNEUMATIC BRAKE BOOSTER WITH IMPROVED VALVE

The present invention relates to pneumatic boosters of the type used to boost braking in motor vehicles.

BACKGROUND OF THE INVENTION

Boosters of this kind are well known in the field of motor vehicles and in the conventional way comprise a casing having an axis of symmetry and divided in leaktight fashion by at least one moving wall structure into a front chamber permanently connected to a low-pressure source and a rear chamber selectively connected to the front chamber or to a high-pressure source by a three-way valve means actuated by an operating rod secured to a plunger, subjected to the action of a return spring and capable of sliding in a bore formed in a pneumatic piston, secured to the moving wall and a tubular rear part of which can slide in leaktight fashion in an opening in the rear wall of the casing, the three-way valve comprising a valve element arranged in the tubular rear part of the moving wall and interacting with a first valve seat formed on the plunger and with a second valve seat formed on the pneumatic piston, the rear position of rest of the plunger being defined by a stop formed at the front end of a sleeve arranged in the tubular rear part of the pneumatic piston.

A great many documents illustrate this type of booster, these including, for example, the document EP-A-0,233, 026. For a long time attempts have been made to improve the performance of such boosters, and in particular to reduce the attack force and the response time so as to obtain rapid actuation of the brakes when the brake pedal is operated, and also to reduce the return time so that the driver can precisely gage his braking action.

The improvement in the response time can conventionally be obtained by increasing the cross section through which air can pass at the first annular valve seat, formed on the plunger, generally by increasing its diameter. By contrast, if the return time of the booster is to be reduced, that necessitates reducing the diameter of the second annular valve seat formed on the pneumatic piston. These two improvements are thus contradictory because, in this design of booster, the valve seats are located in more or less the same plane and the diameter of the first valve seat is limited, among other things, by the diameter of the second valve seat.

SUMMARY OF THE INVENTION

The present invention falls within this context and its object is to provide a booster of the type recalled hereinabove, in which a reduction in the attack force, and in the response and return times can be obtained simultaneously using means that are simple to employ and reliable and which in addition involve modifying only a minimum number of the components of a conventional booster so that maximum use can be made of components already in production so that the cost of the booster will not increase. Such a booster needs in addition to be able to be actuated automatically in a simple way in order to meet the current desires of motor manufacturers.

To this end, the present invention makes provision for the plunger to comprise a cylindrical rear part capable of sliding over the front end of the sleeve, and for the return spring for the operating rod to be arranged between the pneumatic piston and the plunger.

As a preference, the valve element is formed in a flexible component in the form of a circular duct that is symmetric with respect to the axis of symmetry of the booster, the opening of which valve element points backward, and which with a holding piece forms a compensation chamber in permanent communication with the rear chamber of the booster.

Provision can then be made for a compression spring to be arranged in the compensation chamber in order to urge the valve element forward toward the first and second valve seats.

Advantageously, the plunger may slide in leaktight fashion in the bore of the pneumatic piston and comprise a passage allowing the high pressure to act permanently on the front face of the plunger.

According to one embodiment, the sleeve is secured to the tubular rear part of the pneumatic piston by snap-fitting or by being held by a circlip.

According to another embodiment, the sleeve is capable of sliding axially in the tubular rear part of the pneumatic piston between two stops or shoulders of the tubular rear part.

In this last embodiment, provision may be made for the sleeve to be secured to the holding piece and to at least one of the rear ends of the flexible component carrying the valve element.

Provision may also be made for the sleeve to comprise a rear end capable of sliding in a bore formed by pole pieces in which a magnetic flux generated by an electric coil can flow.

The present invention applies to boosters in which the boost force generated by the difference in pressure exerted on the two faces of the moving wall is transmitted to a push rod via an annular front face of the piston acting on a reaction disk against the central part of which the front face of the plunger bears.

It also applies to boosters in which the boost force generated by the difference in pressure exerted on the two faces of the moving wall is transmitted via the moving partition to the piston of a master cylinder in which the hydraulic pressure is exerted on a reaction piston capable of coming into contact with the plunger.

Other objects, features and advantages of the present invention will emerge more clearly from the description which follows of an embodiment given by way of illustration with reference to the appended drawings.

BRIEF DESCRIPTION OF THE DRAWINGS

FIG. 6 depicts a side view in longitudinal section of the central rear part of a pneumatic booster produced according to a second alternative form of the present invention.

DETAILED DESCRIPTION OF THE INVENTION

Figure 1:
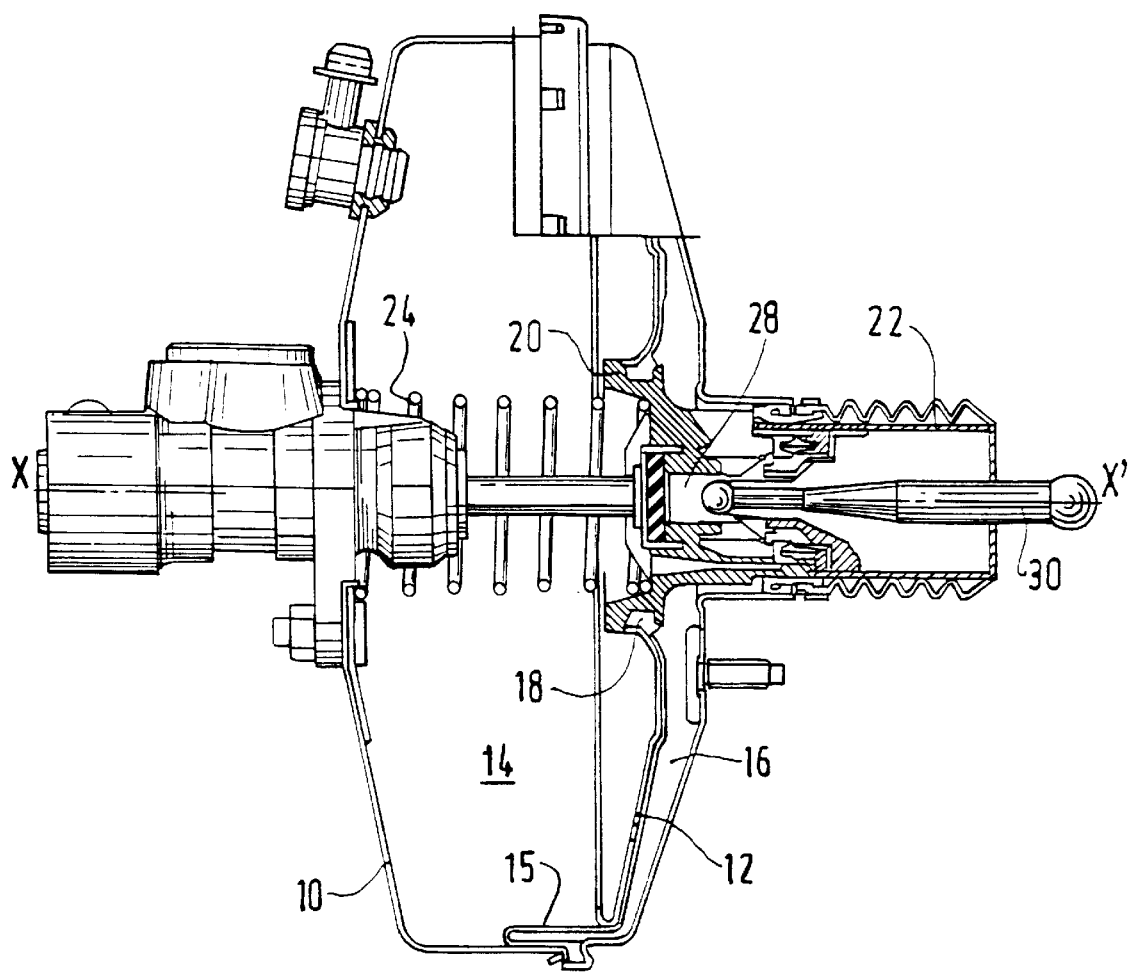
FIG. 1 depicts a side view in longitudinal section of a pneumatic brake booster produced in accordance with the present invention.

FIG. 1 depicts a sectional view of a pneumatic brake booster designed to be placed in the conventional way between the brake pedal of a vehicle and the master cylinder that controls the pressure in the hydraulic braking circuit of this vehicle.

By convention, that part of the booster that points toward the master cylinder is called the "front" and that part of the booster that points toward the brake pedal is called the "rear". In the figures, the front is thus to the left and the rear to the right.

The booster depicted in FIG. 1 comprises an external casing 10 in the form of a shell, which has symmetry of revolution about an axis X-X'.

A moving wall structure 12 delimits a front chamber 14 and a rear chamber 16 within the casing 10. The moving wall 12 is associated with a flexible rolling membrane 15 made of elastomer, the interior peripheral edge of which is housed in leaktight fashion thanks to a roll 18 in a hollow boost piston 20 secured to the moving wall 12 and arranged along the axis X-X' of the booster, and the outer peripheral edge of which is fixed in leaktight fashion to the outer casing 10.

The hollow piston 20 is extended backward in the form of a tubular part 22 which passes in leaktight fashion through the rear wall of the casing 10. A compression spring 24 interposed between the piston 20 and the front wall of the casing 10 normally keeps the piston 20 in the rear position of rest illustrated in the figures, in which position the rear chamber 16 has its minimum volume and the front chamber 14 its maximum volume.

As can be seen better in FIGS. 2 to 6, in the central part of the moving wall situated forward of the tubular rear part 22, the pneumatic piston 20 has a bore 26 in which the front end of a plunger 28 is slidably housed. The front end of a rod 30 for operating the booster, this rod also being arranged along the axis X-X', is mounted in the manner of a ball joint in a blind bore in the plunger 28.

Figures 2, 3:
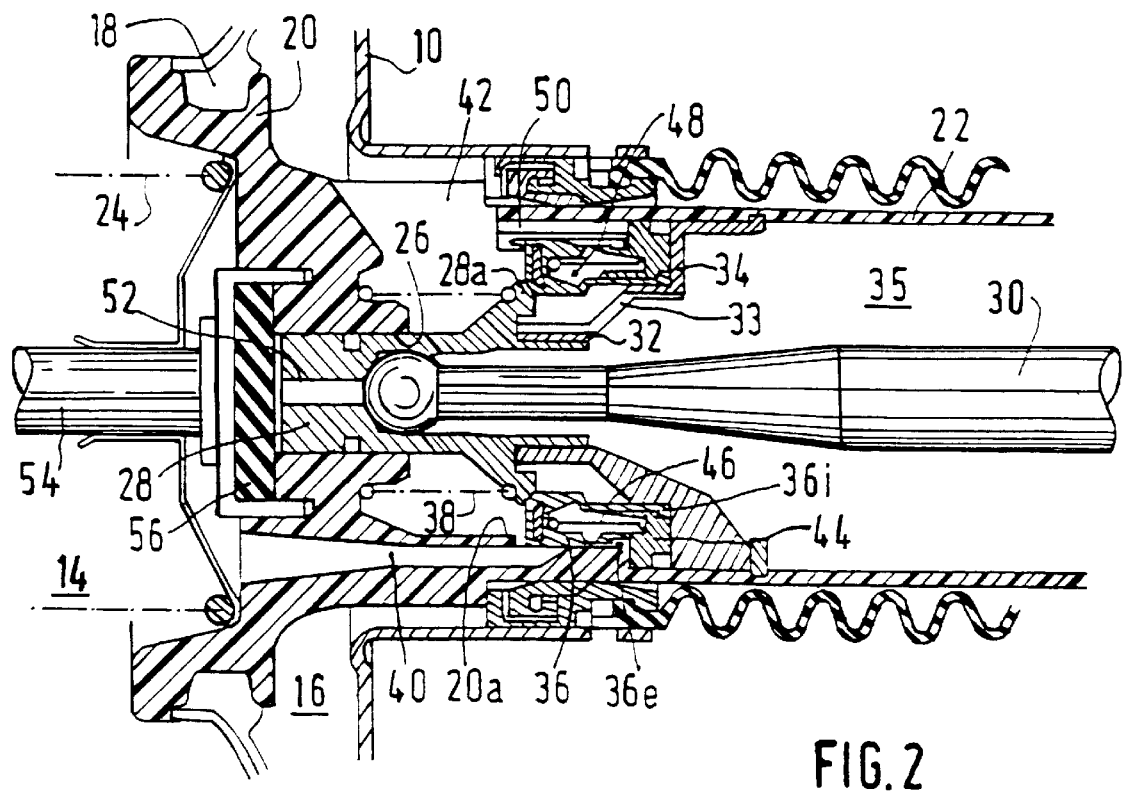
FIG. 2 depicts a side view in longitudinal section of the central rear part of the pneumatic booster of FIG. 1.
FIG. 3 depicts a side view in longitudinal section of the central rear part of a pneumatic booster with hydraulic reaction produced in accordance with the present invention.

The rear end of the plunger 28 is cylindrical and is capable of sliding over the front end 32 of a sleeve 34 arranged in the tubular rear part 22. In the embodiment of FIGS. 2 and 3, the sleeve 34 is secured to the tubular rear part 22, for example by snap-fitting, as has been depicted in the upper half of FIG. 2, or by means of a circlip, as has been depicted in the lower half of FIG. 2. The sleeve 34 also has openings 33.

The rear end (FIG. 1) of the operating rod 30, which projects out of the tubular part 22, is operated directly by the brake pedal (not depicted) of the vehicle.

The plunger 28 controls the operation of the boost means which comprise a three-way valve comprising an annular valve element 36 and two valve seats 20a and 28a formed respectively at the rear of the central part of the piston 20 and at the rear of the plunger 28, the seat 20a surrounding the seat 28a.

A compression spring 38 is arranged between a shoulder of the pneumatic piston 20 and a shoulder of the plunger 28 so as to urge this plunger 28 backward into the position of rest depicted in the figures in which the plunger 28 is resting against the front end 32 of the sleeve 34.

In this position of rest, the first valve seat 28a is bearing against the annular valve element 36 and keeps the latter a short distance away from the second valve seat 20a, so that the front chamber 14 and rear chamber 16 communicate with each other via a more or less axial passage 40 and a more or less radial passage 42 which are formed in the pneumatic piston 20.

The valve 36 constitutes the annular front end, situated in a plane more or less perpendicular to the axis X-X', of a flexible component, for example made of elastomer, in the form of a circular duct or channel section which is symmetric with respect to the axis X-X', and the opening of which points backward. The rear ends 36e and 36i of the lateral walls extending in the direction of the axis X-X' are held by a holding piece 44 cooperating, for example, with the front wall of the sleeve 34. A compression spring 46 is inserted between the front wall of the holding piece 44 and the rear face of the valve element 36 in order to urge the latter forward in the direction of the valve seats 20a and 28a.

The flexible component carrying the valve 36 and the holding piece 44 delimit a volume 48 containing the spring 46 and in permanent communication with the rear chamber 16 of the booster via at least one axial passage 50 formed in the pneumatic piston 20.

When the booster is in its position of rest illustrated in the figures, the rear position of the plunger 28, resting against the front end 32 of the sleeve 34, is such that the valve seat 28a is bearing on the annular front face of the valve element 36 and keeps the latter away from the seat 20a so that the front chamber 14 and rear chamber 16 of the booster communicate via the axial passage 40, the valve passage defined between seat 20a and valve element 36, and the radial passage 42.

In particular, the volume 48, also known as the compensation volume, is subjected to the same pressure as the pressure acting in the rear chamber of the booster, while atmospheric pressure acts on the outside of this volume, behind the valve seat 28a.

It will therefore be understood that the holding piece 44 and the sleeve 34 could be given a shape such that the diameter of the rear end 36i was equal to the diameter of the valve seat 28a. In that way, the difference in pressures exerted on the thin section linking the valve element 36 and the end 36i generates a force that is exerted at right angles to the axis X-X'. The preload at rest on the spring 38 could thus be reduced and at the same time the attack force that has to be supplied in order to actuate the booster could be reduced.

This attack force could advantageously be reduced still further by making provision, as has been depicted in FIGS. 2 and 3, for the plunger 28 to slide in leaktight fashion in the bore 26 of the pneumatic piston 20 and for it to comprise a passage 52 allowing atmospheric pressure to act permanently on the front face of the plunger 28.

In that way, the difference in pressures exerted at rest on the plunger 28 is exerted only on the cross section thereof that is equal to the cross section of the valve seat 28a, minus the cross section of the bore 26. It will thus be understood then that this difference in cross sections can be made as small as desired, and that the preload at rest on the spring 38 could thus be reduced further, while at the same time reducing the attack force.

Upon a braking action, the driver of the vehicle depresses the brake pedal in order to move the operating rod 30 forward. The plunger 28 slides in the bore 26 and over the front part 32 of the sleeve 34 so that the annular front face of the valve element 36 comes into contact with the seat 20a, thus isolating the front 14 and rear 16 chambers from one another.

As the plunger 28 continues to move forward in the pneumatic piston 20, the valve seat 28a moves away from the annular front face of the valve element 36, and this places the annular space 35 in communication with the rear chamber 16 via the openings 33 made in the sleeve 34.

Thanks to the invention, and in particular to the design of the valve element 36, as can be seen in the figures, the valve seat 28a could be given a relatively large diameter so that the valve passage defined by valve seat 28a and valve element 36 would have an enlarged cross section, thus allowing air in the annular space 35 to enter the rear chamber 16 of the booster with greater ease, and thus allowing the response time of the booster to be minimized.

Furthermore, the special arrangement of the return spring 38 has the additional advantage that the spring is outside of the path of the moving air and does not present any obstacle to this movement, which it does in boosters of the prior art where the return spring is conventionally arranged around the operating rod 30, bearing on a shoulder of the tubular rear part 22.

The pressure can thus increase rapidly in the rear chamber 16 of the booster and create a pressure difference on the moving wall 12, generating a boost force which tends to move it forward.

In the embodiment of FIG. 2, this force is transmitted to a push rod 54 by an annular front face of the piston 20 acting on a reaction disk 56, against the central part of which the front face of the plunger 28 bears.

In the embodiment of FIG. 3, this force is transmitted by the moving partition 12 directly to the piston of the master cylinder, in which the pressure of the hydraulic fluid increases and acts on a reaction piston which moves backward and comes into contact with the plunger 28, according to technology which is well known with hydraulic-reaction boosters.

When the driver of the vehicle wishes to reduce his braking action or put an end to it, he releases his force on the operating rod 30 and the return spring 38 acting on the plunger 28 returns the latter backward taking the operating rod 30 with it.

The valve seat 28a first of all comes into contact with the valve element 36, thus interrupting the communication between the annular space 35 and the rear chamber 16. Next, the valve seat 28a lifts backward the valve element 36 from the valve seat 20a, thus again allowing communication between the front 14 and rear 16 chambers of the booster, with a shortened return time.

Figure 4:
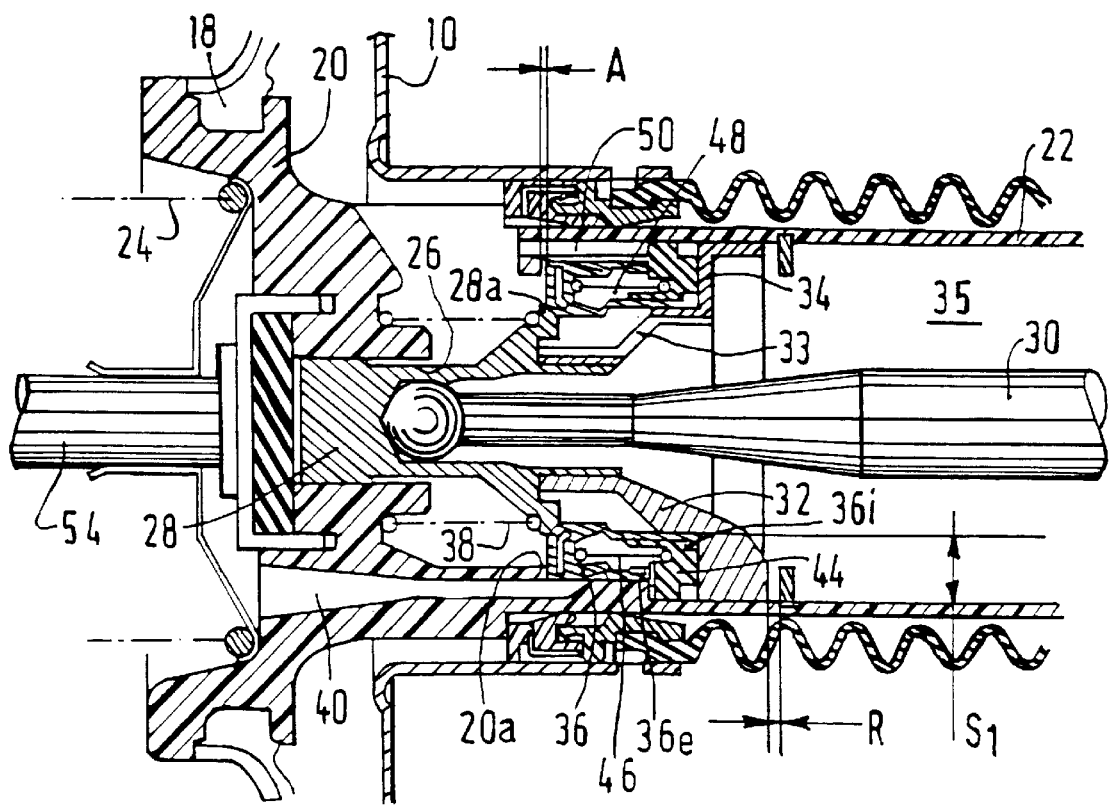
FIG. 4 depicts a view similar to that of FIG. 2, showing the central rear part of a pneumatic booster produced according to an alternative form of the present invention.
Figure 5:
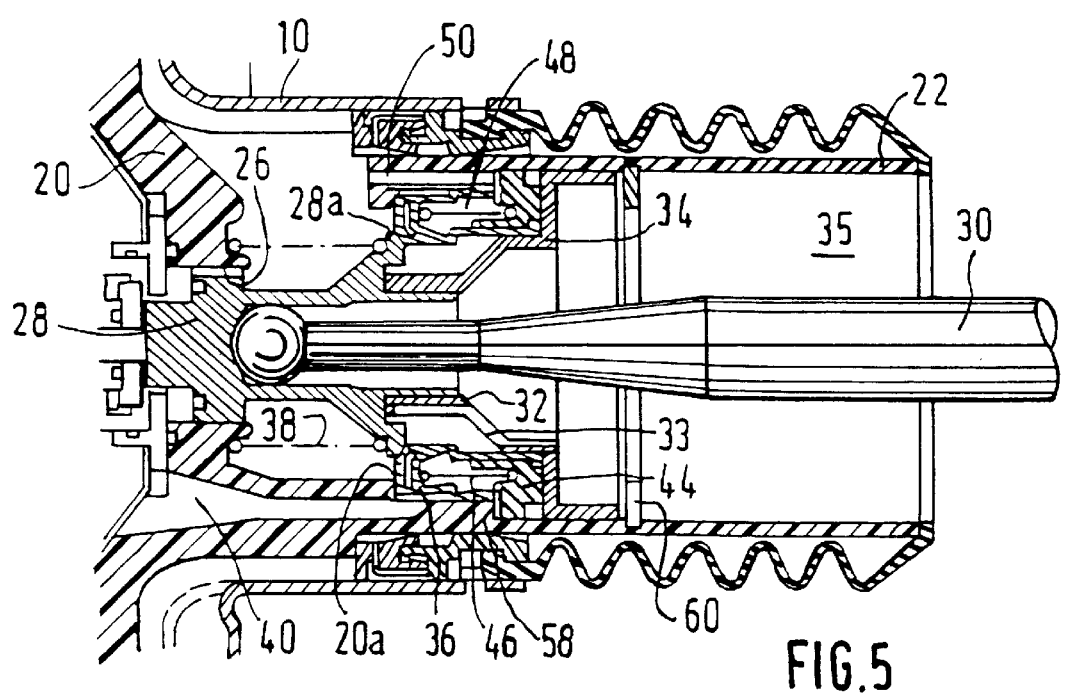
FIG. 5 depicts a view similar to that of FIG. 3, showing the central rear part of a pneumatic booster with hydraulic reaction produced according to the alternative form of FIG. 4.

This return time can advantageously be reduced still further with the alternative form depicted in FIGS. 4 and 5 which relate respectively to boosters with a reaction disk and with hydraulic reaction.

In this alternative form, the sleeve 34 is mounted in the tubular rear part 22 in such a way that it can slide axially in this part 22 over a distance R between two stops or shoulders 58 and 60 (FIG. 5) of the rear tubular part 22. The sleeve 34 is secured to the holding piece 44 and to the end 36i of the flexible component carrying the valve element 36, the other end 36e being secured to the tubular rear part 22, for example by means of a metallic insert. The other components are identical to those described earlier and will therefore not be described again in detail.

In the position of rest depicted in FIGS. 4 and 5, the sleeve 34 and the holding piece 44 are resting at the front against the shoulder 58. There is therefore actually a partial vacuum in the front 14 and rear 16 chambers of the booster, as well as in the compensation chamber 48. The cross section $S_1$ of the sleeve 34 is therefore subjected to a forward force $F_1$ generated by the pressure difference $\Delta P$ exerted across the two sides of this cross section $S_1$, the force $F_1$ being equal to the product of the cross section $S_1$ times the pressure difference $\Delta P$ and less than the antagonistic force exerted by the spring 38, whose preload at rest is relatively low as was seen earlier.

Upon a braking action, the operation of the booster in this alternative form is identical to that which has been described in relation to FIGS. 2 and 3. The same characteristics as those described in relation to these boosters, namely a very short response time and a short initial dead travel, are therefore still obtained.

When the driver of the vehicle wishes to reduce his braking action or put an end to it, he releases his force on the operating rod 30 and the return spring 38 acting on the plunger 28 returns the latter backward taking the operating rod 30 with it.

The pressure in the compensation chamber 48 is then equal to the pressure in the rear chamber of the booster, which is therefore between the partial vacuum that there is in the front chamber 14 of the booster and atmospheric pressure that there is in the annular space 35. It then follows that the force $F_2$ exerted on the cross section $S_1$ of the sleeve 34 is lower than the force $F_1$ that was exerted when the booster was at rest, this force $F_2$ therefore being lower than the force exerted by the return spring 38.

The result of this then is that the valve seat 28a comes into contact with the valve element 36, lifts the valve element 36 backward away from the valve seat 20a, and also drives along with it the sleeve 34 and the holding piece 44 over the distance R. The valve element 36 therefore moves away from the valve seat 20a by the distance A, which there is normally in the position of rest (FIG. 4), plus the distance R, the value of which can be chosen at will. This does indeed achieve a passage cross section which is appreciably enlarged for the air moving from the rear chamber 16 toward the front chamber 14, and therefore does indeed achieve an extremely short return time.

It can therefore be clearly seen that a booster has been achieved in which the response time and the return time can be influenced independently of each other, particularly so that both can be improved at the same time. Such a simultaneous improvement is obtained by means that are simple to employ, reliable and inexpensive. Furthermore, the other standard components of the booster, such as the outer casing and the moving wall secured to the piston, can be used as they are to implement the present invention, and this further contributes to reducing its cost.

FIG. 6 depicts another alternative form of the present invention which makes it possible to obtain an additional function such as automatic braking, that is to say braking without the intervention of the driver of the vehicle. Such automatic braking actions may be set off by one or more detectors of operating parameters or attitude of the vehicle, for example, in order to prevent the wheels from spinning during acceleration of the vehicle, to assist the driver of the vehicle with hill starts or under the control of a device of the anti-collision radar type.

For this, the booster depicted in FIG. 6 is equipped with an electromagnet comprising an electric coil 110 capable of making a magnetic flux flow through two pole pieces 112 and 114, a cylindrical field frame 116 made of magnetic material surrounding the coil 110 and being fixed in the tubular rear part 22.

The pole pieces 112 and 114 define a common internal bore 120 in which a magnetic core plunger 134 can slide, this core plunger constituting the cylindrical rear end 134 of the sleeve 34 which is therefore made of a magnetic material, for example mild or very-low carbon steel, and which is subjected to the magnetic flux flowing through the pole pieces 112 and 114 and through the field frame 116 so as to form a practically closed magnetic circuit.

The pole piece 112 is shaped in such a way that the electromagnet operates in a proportional way. More specifically, it is known that coils of this type have the essential property of being able to provide a more or less constant force for a given current over an appreciable range of travel of the magnetic core plunger 134 of the order of several millimeters.

An electromagnet of this type therefore has the advantage that it can be controlled simply by varying the current flowing through the coil, for example using a microprocessor which chops a DC current at a variable frequency, or at a fixed frequency and with a variable duty cycle. The other components of the booster are identical to those which have already been described above in relation to FIGS. 2 and 3.

At rest, that is to say when there is no electric current flowing through the coil 110, the various components of which the booster is made occupy the position depicted in FIG. 6. The driver of the vehicle can therefore carry out braking actions when he wishes, the booster therefore operating as was described above.

When a computer detects a need for automatic braking, it increases the current in the coil 110. This current, via the pole pieces 112 and 114, generates a force on the magnetic core plunger 134 and on the sleeve 34 which moves against the action of the spring 38.

Thanks to the special design of booster according to the present invention, and in particular of the valve element subjected to the action of the compensation chamber 48 and of the plunger 28 which is subjected to a pressure difference only on a small cross section, it has been seen earlier that the preload at rest of the spring 38 can be very low. The result of this is that the force that the electromagnet needs to supply may also be very low, and therefore that the electromagnet can be of a small size.

The sleeve 38 will therefore permanently adopt a position which is such that the resultant of the antagonistic forces exerted on it by the spring 38 and by the coil 110 is nil. It will thus be understood that through appropriate changes to the strength of the current flowing through the coil 110, the magnetic core plunger 134 and the sleeve 34 will control the operation of the booster in response to the signals supplied by the various sensors with which the vehicle is equipped, in the same way as would the driver of the vehicle.

Of course, the invention is not limited to the embodiments which have been described, but can on the contrary be modified in a number of ways which will be obvious to those skilled in the art. Thus the invention of course applies in the same way to boosters of the tandem type or to boosters with additional chambers.

I claim:

1. A pneumatic brake booster comprising:

a casing having an axis of symmetry;

at least one movable wall dividing said casing in a leaktight fashion into a front chamber and a rear chamber, said front chamber being permanently connected to a low-pressure source;

a pneumatic piston secured to said wall and having a tubular rear part that extends in a leaktight fashion through an opening in a rear wall of said casing, said pneumatic piston having a bore therein; and a three way valve means including: a plunger which slides in said bore; a return spring acting on said plunger; a valve element arranged in said tubular rear part and interacting with a first valve seat formed on said plunger and a second valve seat formed on said pneumatic piston, said return spring urging said plunger toward a stop formed at a front end of a sleeve arranged in said tubular rear part; and an operating rod connected to said plunger for moving said valve element to selectively connect to said rear chamber to said front chamber and to a high pressure source in response to an input force to effect a brake application, characterised in that said plunger has a cylindrical rear part that slides over said front end of said sleeve in response to movement of said operating rod, and in that said valve element is formed of a flexible component in the form of a circular duct that is symmetrical to the axis of symmetry of said brake booster with an opening for the valve element pointing backward and moves in response to movement of said operating rod, and in that said return spring is located between said pneumatic piston and said plunger such that said return spring is not in a flow path between the high pressure source and said rear chamber, and in which a holding piece associated with said valve element forms a compensation chamber in permanent communication with said rear chamber of the booster to reduce the input force required to move the valve element to effect a brake application.

2. The pneumatic brake booster according to claim 1 characterised in that a compression spring is arranged in said compensation chamber for urging said valve element toward said first and second valve seats.

3. The pneumatic brake booster according to claim 1 characterised in that said plunger slides in a leaktight fashion in said bore of said pneumatic piston and has a passage allowing communication of said high pressure source to act permanently on a front face of said plunger.

4. The pneumatic brake booster according to claim 1 characterised in that said sleeve is secured to said tubular rear part of said pneumatic piston by a snap-fitting component.

5. The pneumatic brake booster according to claim 1 characterised in that said sleeve is secured to said tubular rear part of said pneumatic piston by a circlip.

6. The pneumatic brake booster according to claim 1 characterised in that said sleeve axially slides in said tubular rear part between first and second stops of said tubular rear part.

7. The pneumatic brake booster according to claim 1 characterised in that said sleeve is secured to said holding piece and to a flexible component of said valve element.

8. The pneumatic brake booster according to claim 1 characterised in that said sleeve has a rear end which slides in a second bore formed by first and second pole pieces in response to a magnetic flux generated by an electric coil.

9. The pneumatic brake booster according to claim 1 characterised in that a boost force is generated by a difference in pressure exerted across first and second faces of said moving wall and transmitted through a reaction disc into a push rod and through a central part into a front face of said plunger.

10. The pneumatic brake booster according to claim 1 characterised in that said a boost force is generated by a difference in pressure exerted across first and second faces of said moving wall to a piston of a master cylinder in which hydraulic pressure is exerted on a reaction piston which contacts said plunger.

11. A pneumatic brake booster comprising:

a casing having an axis of symmetry;

at least one movable wall dividing said casing in a leaktight fashion into a front chamber and a rear chamber, said front chamber being permanently connected to a low-pressure source;

a pneumatic piston secured to said wall and having a tubular rear part that extends in a leaktight fashion through an opening in a rear wall of said casing, said pneumatic piston having a bore therein; and a three way valve means including: a plunger which slides in said bore; a return spring acting on said plunger; a valve element arranged in said tubular rear part and interacting with a first valve seat formed on said plunger and a second valve seat formed on said pneumatic piston, said return spring urging said plunger toward a stop formed at a front end of a sleeve arranged in said tubular rear part; and an operating rod connected to said plunger for moving said valve element to selectively connect to said rear chamber to said front chamber and to a high pressure source in response to an input force to effect a brake application, characterised in that said plunger has a cylindrical rear part that slides over said front end of said sleeve and said sleeve moves in said bore of said pneumatic piston in response to movement of said operating rod, and in that said plunger includes a passage for allowing communication from said high pressure source to permanently act of a first face of said plunger to enhance the effect of said input force on said valve element, and in that said return spring is located between said pneumatic piston and said plunger such that said return spring is not in a flow path between the high pressure source and said rear chamber.

12. The pneumatic booster as recited in claim 11 wherein said sleeve has a rear end which slides in a second bore defined by first and second poles in response to a magnetic flux generated by an electric coil.

13. A pneumatic brake booster comprising:

a casing having an axis of symmetry;

at least one movable wall dividing said casing in a leaktight fashion into a front chamber and a rear chamber, said front chamber being permanently connected to a low-pressure source;

a pneumatic piston secured to said wall and having a tubular rear part that extends in a leaktight fashion through an opening in a rear wall of said casing, said pneumatic piston having a bore therein; and a three way valve means including: a plunger which slides in said bore; a return spring acting on said plunger; a valve element arranged in said tubular rear part and interacting with a first valve seat formed on said plunger and a second valve seat formed on said pneumatic piston, said return spring urging said plunger toward a stop formed at a front end of a sleeve arranged in said tubular rear part; and an operating rod connected to said plunger for moving said valve element to selectively connect to said rear chamber to said front chamber and to a high pressure source in response to an input force to effect a brake application, characterised in that said plunger has a cylindrical rear part that slides over said front end of said sleeve in response to movement of said operating rod, and in that said sleeve axially slides between first and second stops in said tubular part, and in that said return spring is located between said pneumatic piston and said plunger such that said return spring is not in a flow path between the high pressure source and said rear chamber.

* * * * *